May 23, 1967

T. M. CARTER 3,321,137

AGRICULTURAL SPRAYER

Filed Sept. 9, 1965

INVENTOR.
THOMAS M. CARTER
BY
JOHN P. CHANDLER
HIS ATTORNEY.

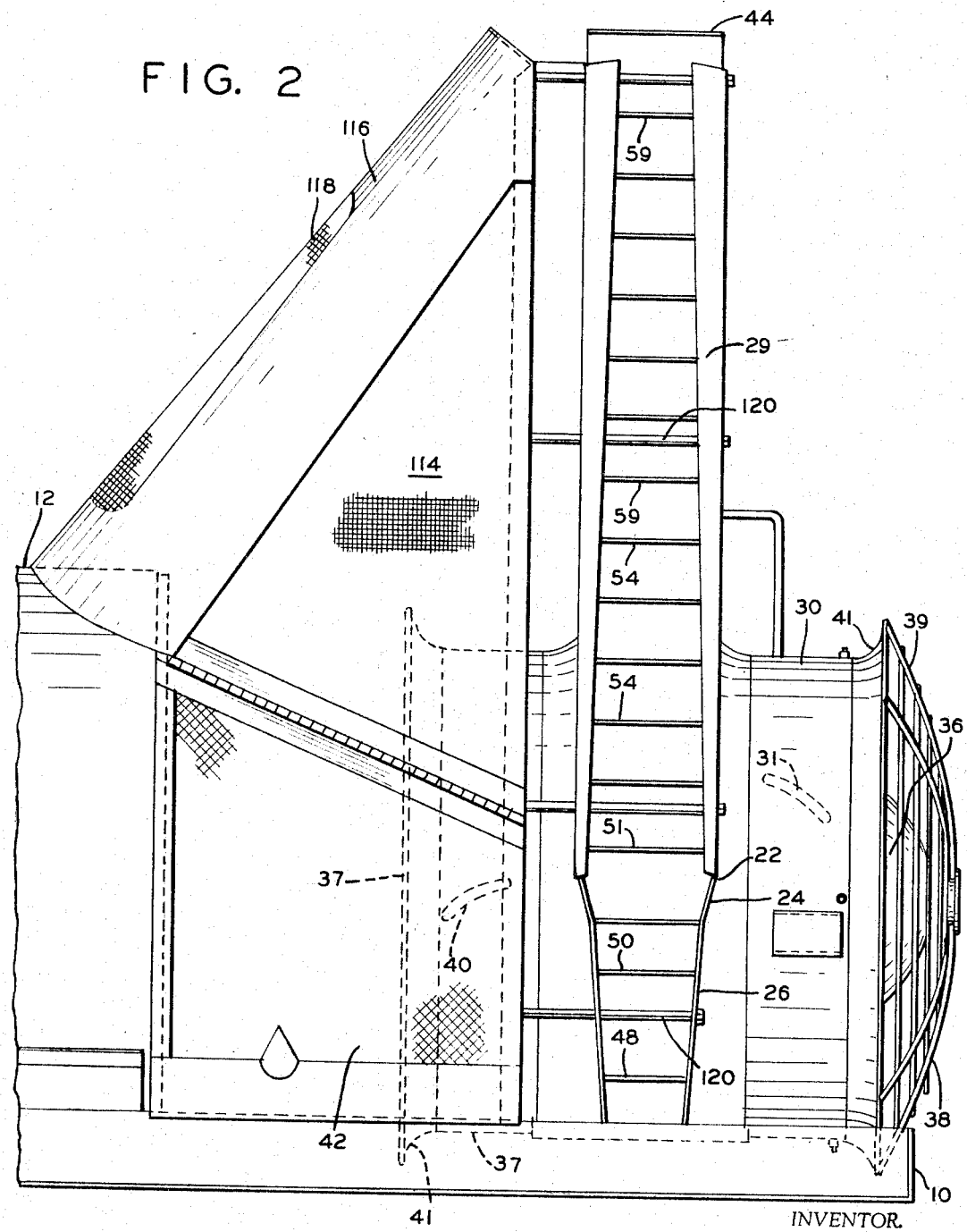

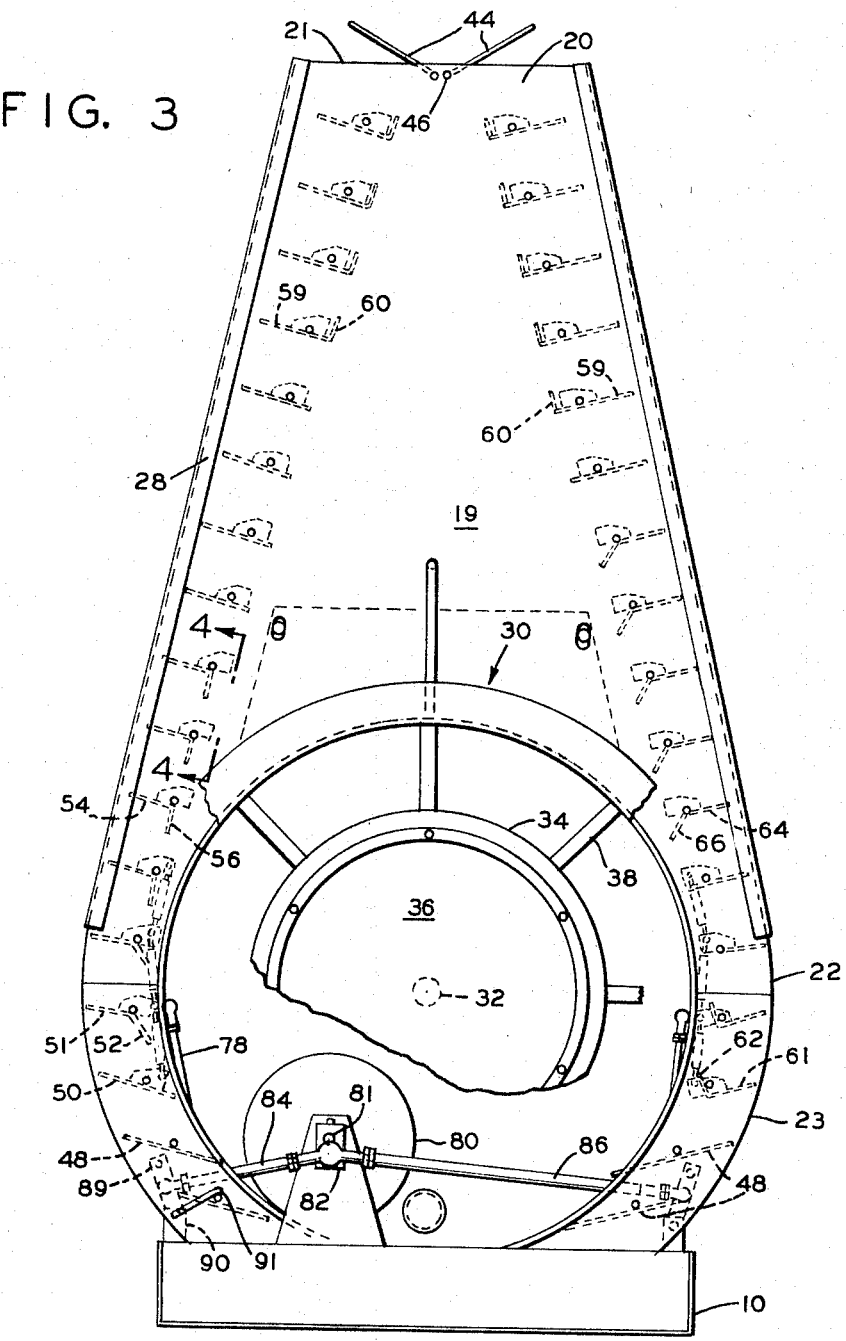

May 23, 1967  T. M. CARTER  3,321,137
AGRICULTURAL SPRAYER
Filed Sept. 9, 1965  4 Sheets-Sheet 4
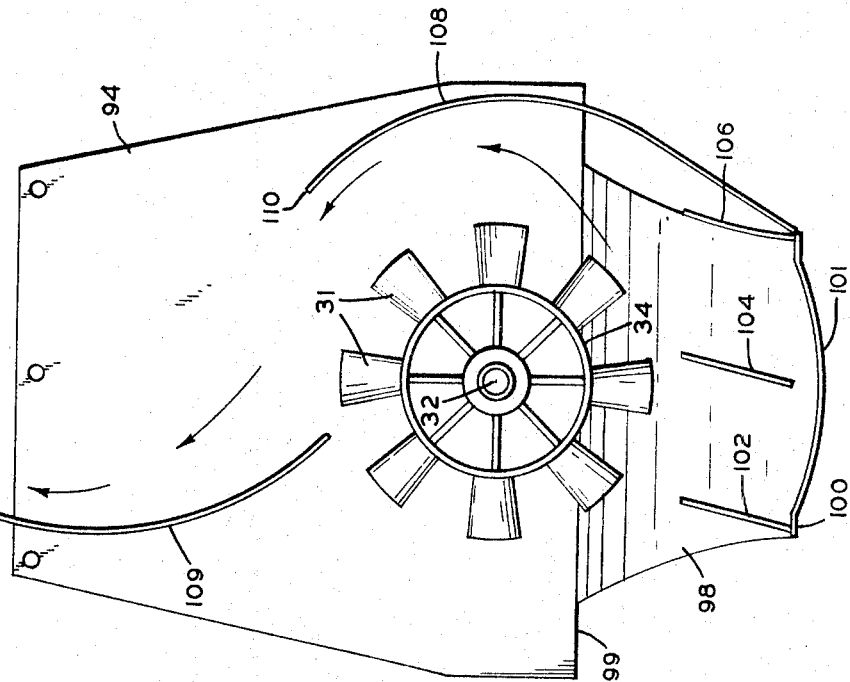
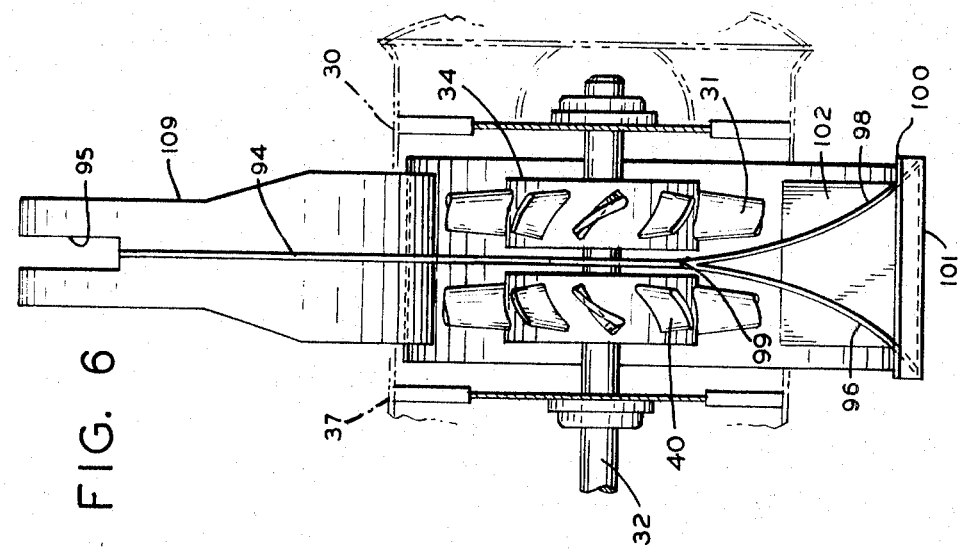
INVENTOR.
THOMAS M. CARTER
BY
JOHN P. CHANDLER
HIS ATTORNEY.

__United States Patent Office__

3,321,137
Patented May 23, 1967

3,321,137
AGRICULTURAL SPRAYER
Thomas M. Carter, Glenside, Pa., assignor to Universal American Corporation, New York, N.Y., a corporation of Delaware
Filed Sept. 9, 1965, Ser. No. 486,172
7 Claims. (Cl. 239—78)

This invention relates to air blast agricultural sprayers and relates more particularly to an improved tower type of sprayer wherein the air blast is directed upwardly and outwardly so as to give a more efficient spray coverage, particularly in citrus groves where the dense foliage prevents sufficient movement of the air to reach the tree tops.

In most citrus groves, about two-thirds of the fruit is located in the top one-third of the tree and in conventional sprayers where an arcuate discharge opening is located just a few feet above ground level, it is difficult to wet the leaves at the tops of the trees, and conventional oscillators, such as shown in Britten et al. Patent No. 2,784,521, aid very little.

The principal object of the present invention is to provide an air blast sprayer with a raised pyramid type of tower with a discharge opening on each side of the tower wherein the tapered profile affords complete utilization of a large capacity and highly effective blower unit and wherein the taper also helps reduce profile interference with overlapping limbs to the maximum compatible with efficient spray coverage.

The efficiency is heightened by a novel system of oscillating vanes located on each side of the long air discharge orifice, the vanes having various angular profiles to secure the maximum spray penetration to the fruit, a large portion of which is inside the outer foliage.

To this end, the invention includes means for generating an air blast which is here illustrated as comprising a pair of fans fast on a single shaft with oppositely set blades to generate an intense pressure in a central zone which is centrally divided by a plate having curved volutes at the lower end of an air blast chamber to direct the air away from a closed bottom, and two spaced, concavely curved air deflector plates of generally S-shaped configuration mounted on each side of the divider plate, said deflector plates diverting the air upwardly where it is most needed. If the orchard is of the canopy type where the trees of pairs of rows are joined at the top, the top opening in the tower is most useful but if there is considerable space between the rows this top opening may be eliminated. Several vanes at the very top and bottom have flat contours and are not driven but are manually movable to an adjusted fixed position, while the oscillating vanes are adjustable as to stroke and height, thus providing the most effective and highly concentrated air stream for every type of grove, and particularly those where it is necessary to direct the air to the great heights and distances from the chamber where the air blast is generated. This greater concentration of the air blast is effected by having the vanes on one side 180° out of phase with those on the other. For most types of orchards, the pyramid configuration of tower gives the best results, but spaced plates of rectangular contour gives equally good results in others. The principal thing is to provide a pair of opposed, generally vertical spaced slots that sends the insecticide laden air blasts out in a direction generally upwards.

Another object of the invention is to provide an improved pivotal support for a system of oscillating vanes and an air blast sprayer.

In the drawings:

FIG. 2 is a side elevation of the rear section of the unit including the spray tower and the blower assembly;

FIG. 3 is a rear elevation of the tower section;

FIG. 6 is a side elevation of a baffle assembly for the air blast distribution system;

FIG. 7 is a rear elevation thereof.

Figure 1:
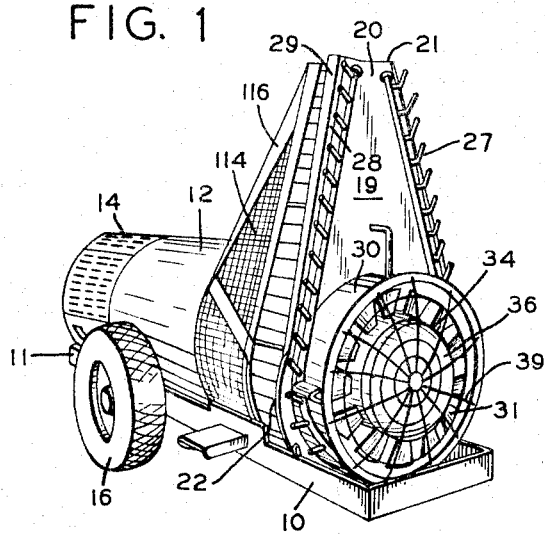
FIG. 1 is a perspective view from the rear, of an air blast agricultural spray unit of the present invention.

The air blast tower sprayer of the present invention is supported on a rectangular frame 10 of rugged construction, the forward section 11 of which carries a tank 12 for the liquid insecticide or other spray material and a housing 14 for an engine (not shown) to drive the fan. The unit also has a hitch at its forward end for attachment to a tractor and is provided with a pair of wheels with heavy tires 16 at the weight center of the rig.

The tower has a generally pyramidal shape when viewed from the rear and is composed of front and rear substantially V-shaped plates 18 and 19 whose opposed side edges are straight and converge inwardly to form an upper tower section 20 with an upper horizontal edge 21 of something less than half the width of its widest lower section indicated at point 22 and below this section the edges of the plates are curved inwardly at 23, when viewed from the rear. The plates are flat over their upper portions but below point 22 the plates, when viewed from the side, are bent to converge inwardly at 24 for a short distance and below 24 they are bent to converge inwardly, at 26, at a lesser angle, all for a purpose to be described.

On each side of the tapered tower, there is a pair of angle members secured to the edges of the plates and which extend upwardly from said point 22. Each angle includes a flange 28 which is bolted to the plate. The other flange 29 is at right angles to the first and is of tapered width and has its greatest width at the top, thus progressively reducing the width of the air blast discharge opening and concentrating the air blast in the area furthest removed from the blower section. A plurality of nozzles direct the spray material into this discharge area.

To the rear of the tower, there is a cylindrical housing 30 for one of the fans 31 fast on a drive shaft 32. The blades extend radially outwardly from a hub 34 and the central section of the hub is substantially closed by a fixed cap or dome 36 mounted on radial struts 38. A protective screen 39 covers the rear opening of the cylindrical housing.

The blades 40 are identical with fan blades 31 except that the blades are set at the reverse angle and this forward fan rotates within a similar cylindrical housing 37. Both fan housings are outwardly flared at their air intake ends as shown at 41 and the duo-fan assembly is in many respects the same as that shown in Tuft Patent No. 2,762,651.

The fan shaft runs forwardly through a chamber 42 containing the means for imparting oscillation to the vanes, and thence through a tube (not shown) within tank 12 and up to the engine.

The air flow pattern through the truncated V-shaped air blast discharge opening between the plates is modified by a series of oscillating vanes of various surface configurations. There are also a number of generally flat vanes which do not oscillate but which are moved to an adjusted, fixed position to suit different spraying conditions. In this latter group are a pair of vanes 44 at the top of the tower, pivoted at 46, and which can substantially close the opening formed by the spaced plates. At the bottom of the tower on each side, there are two pairs of generally flat, centrally pivoted vanes 48.

Above the latter vanes are the vanes which oscillate at a speed of about 50 times per minute and the vanes on one side have a slightly different configuration from those on the other. Considering first the left hand side when viewed from the rear, there is a flat, centrally pivoted vane 50 and then two vanes 51 having inner section 52 bent downwardly at an angle of about 45° and of lesser width than the outer section. Next follow four vanes 54 with inner sections 56 bent downwardly at an angle of about 90°. The remaining vanes 59, eight being shown, each have inner sections 60 bent upwardly at an angle of about 90°.

On the opposite side, there are shown four vanes 61 having inner sections 62 bent upwardly at an angle of about 90° and then follow four vanes 64 having inner sections 66 bent downwardly at an angle of about 45° and the remaining vanes 59 are the same as on the opposite side.

Figure 5:
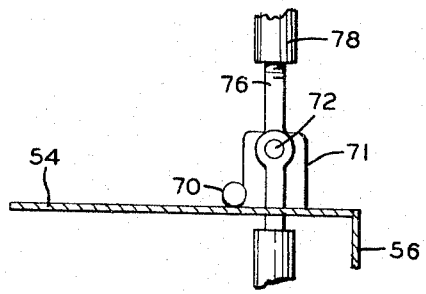
FIG. 5 is a broken section taken on lines 5—5 of FIG. 4.
Figure 4:
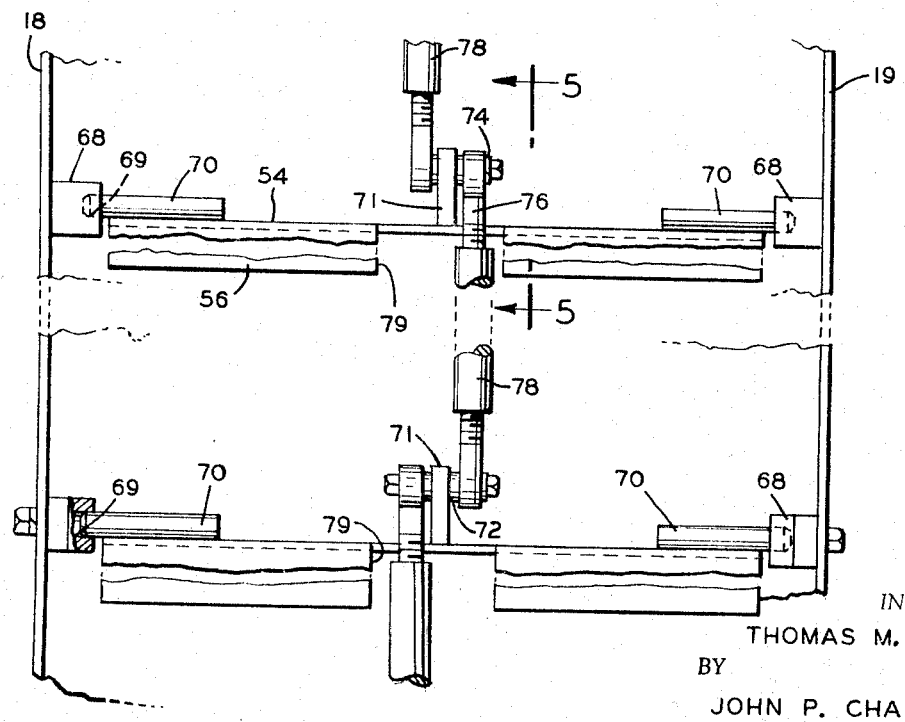
FIG. 4 is a broken section showing the drive for the oscillating vanes.

The means for pivotally mounting the vanes and the linkage for producing the oscillating movement is shown in FIGS. 4 and 5. Each of tower plates 18 and 19 have aligned bearing blocks 68 for each vane, the block preferably being made from plastic material and having bearing holes 69. Each vane has pivot pins 70 received in the bearing holes. Each vane has a crank section 71 and their crank sections have wrist pins 72 with spherical bearing heads 74 received in bearing openings in a threaded stud 76 which is longitudinally adjustable. A similar stud is carried at each end of link 78. It will be noted that the vanes 54 have slots 79 to provide clearance for the linkage member.

A wheel 80 driven from drive shaft 32 is fast on a shaft 81 with a crank 82 providing an eccentric connection with drive rods 84 and 86 connected at their opposite ends with bell crank levers 89 pivoted for rocking movement on bracket 90. Links 78 are connected with the second lever 91 of the bell crank. The parts are so arranged that the vanes on one side are raised as those on the opposite side are lowered. In this fashion, the vanes on one side are 180° out of phase with those on the opposite side and the linkage drives are so proportioned as to cause the main sections of the vane to move from a plane about 10° to 15° above the horizontal to about 50° to 60°. In order to avoid confusion in illustration, the vanes as shown in FIG. 2 are all on a horizontal plane.

The air baffle system shown in FIGS. 6 and 7 includes a fixed divider plate 94 mounted midway between the fans 31 and 40 in a plane parallel to the plane of rotation of the fans. Curved plates or volutes 96 and 98 extend forwardly and rearwardly from the lower edge 99 of the divider plate and they are connected along their lower edges by a base plate 100. This base plate is curved downward in its central section at 101 and extending through curved plates 96–98 are a pair of deflector blades 102 and 104 inclined in the direction of rotation of the fans indicated by the lower arrow in FIG. 7.

At the right hand side of the curved plates is a third deflector blade 106 and extending upwardly from the base is a lower deflector 108. This extends about half the height of divider 94 and an upper deflector 109 extends from a point below the upper edge 110 of deflector 108 to a point 111 above the upper edge of divider 94.

The controlled air blast travels upwardly as indicated by the arrows because of this novel, generally S-shaped deflector system formed in two-speed concave sections and about two-thirds of the air is directed to the upper one-third of the trees as the dense foliage separates due to the action of the oscillating vanes.

The area 42 within, which the forward air housing 36 and the drive for the fans including drive wheel 80 are placed, is closed by a screen system 114 and above this screen system is a diagonal sheet metal housing 116 with a screen 118. The air blast structure is secured together by a series of tie rods 120.

What I claim is:

1. An air blast sprayer including a mobile unit, a tower carried thereon and formed from a pair of generally rectangular upright plates whose opposed vertical edges are spaced apart and form elongated air discharge areas, nozzles for directing jets of spray material into said areas, a blower section at the base of the tower comprising a shaft, means for generating a blast of air directed upwardly of the tower, a deflector assembly in the blower section including a transverse divider plate, a pair of oppositely curved volutes at the lower end of the plate, blades extending from the volutes and into the blower section, and lower and upper concavely curved deflector plates fixed on the divider plate for directing the air upwardly of the tower.

2. An air blast sprays including a mobile unit, a tower carried thereon and including a pair of spaced plates forming an air discharge area extending over the opposed sides thereof, nozzles for directing jets of spray material into the space between the plates, means for creating an air blast which can be discharged through said area, a deflector assembly including a transverse vertical divider plate, curved volutes at the lower end of the said plate, blades extending from the volutes and into the air blast section, lower and upper concavely curved deflector plates on the divider plate directing the air upwardly of the tower, and a series of vanes pivoted between the spaced plates along the sides of the air discharge area, and means for oscillating the vanes in planes from the horizontal to about 45° above the horizontal.

3. An air blast sprayer including a mobile unit, a tapered tower carried thereon and formed from a pair of spaced plates and forming an air discharge area extending over the opposed side thereof, nozzles for directing jets of spray material into said area, a blower section at the base of the tower comprising a shaft, a fan fast on the shaft, means for driving the shaft, a deflector assembly including a transverse vertical plate extending upwardly from the blower section, a pair of oppositely curved volutes at the lower end of the vertical plate, blades extending from the volutes and into the blower section, lower and upper concavely curved deflector plates on the vertical plate directing the air upwardly of the tower, and a series of vanes between the spaced plates along the sides of the air discharge area.

4. An air blast sprayer including a mobile unit, a tapered tower carried thereon and formed from a pair of spaced plates of inverted V-shape and forming an air discharge area extending over the opposed sides of and top thereof, nozzles for directing jets of spray material into said area, a blower section at the base of the tower comprising a shaft, a pair of spaced oppositely disposed, axial flow fans fast on the shaft, means for driving the shaft, a deflector assembly including an air divider plate between the fans, a pair of oppositely curved volutes at the lower end of the divider plate, blades extending from the volutes and into the blower section, lower and upper concavely curved deflector plates on the divider plate directing the air upwardly of the tower, and a series of vanes pivoted between the spaced plates along the sides of the air discharge area, and means for oscillating the vanes.

5. An air blast sprayer including a mobile unit, a tower carried thereon and formed from a pair of spaced, inverted V-shaped plates whose opposed side edges form an air discharge area, nozzles for directing jets of spray material into said area, a blower section at the base of the tower comprising an air blast blower, an engine for driving the blower, a deflector assembly including a supporting plate in the air discharge area, volutes at the lower end of the plate, and spaced upper and lower deflector plates of generally concave configuration on the supporting plate.

6. An air blast sprayer including a mobile unit, a tower carried thereon and formed from a pair of spaced plates whose opposed side edges form an air discharge area, nozzles for directing jets of spray material into said area, a blower section at the base of the tower comprising a shaft, an axial flow fan fast on the shaft, an engine for driving the shaft, a deflector assembly including a vertical plate, a pair of concave volutes at the lower end of the vertical plate, blades extending from the volutes, spaced upper and lower deflector plates of generally concave configuration on the divider plate for directing the air upwardly of the tower, and a series of vanes pivoted between the spaced plates along the sides of the air discharge area, and means for oscillating the vanes on one side out of phase with those on the other side.

7. An air blast sprayer including a mobile unit, a tapered tower carried thereon and formed from a pair of spaced plates of inverted V-shaped configuration and forming an air discharge area extending over the opposed sides of and top thereof, nozzles for directing jets of spray material into said area, a blower section at the base of the tower and which is divided transversely of the unit and comprising a shaft, a pair of spaced oppositely disposed, axial flow fans fast on the shaft, a motor for driving the shaft, a deflector assembly including an air divider plate between the fans, a pair of oppositely disposed volutes at the lower end of the divider plate, blades extending from the volutes, and into the blower section, lower and upper deflector plates which are concavely curved on their inner faces secured on the divider plate for directing the air upwardly of the tower, and a series of vanes pivoted between the spaced plates along the sides of the air discharge area, the upper vanes having upwardly extending inner flanges and the lower vanes having downwardly extending flanges, and means for oscillating the vanes from a plane just above the horizontal to a plane about 45° above the same, the vanes on one side being raised while those on the opposite sides are lowered.

References Cited by the Examiner
UNITED STATES PATENTS

| | | | |
|---|---|---|---|
| 2,706,596 | 4/1955 | Hait | 239—78 |
| 2,925,222 | 2/1960 | Spreng | 239—78 |
| 3,009,644 | 11/1961 | Meadowcraft et al. | 239—78 |
| 3,088,676 | 5/1963 | Nottingham | 239—78 |
| 3,168,238 | 2/1965 | Carrigan | 239—78 |
| 3,278,124 | 10/1966 | Wolford | 239—78 |

EVERETT W. KIRBY, *Primary Examiner.*